United States Patent [19]

Bain

[11] 3,777,558

[45] Dec. 11, 1973

[54] STRAIN-LEAF BURR HEIGHT DETECTOR
[75] Inventor: James A. Bain, Erie, Pa.
[73] Assignee: General Electric Company, Schenectady, N.Y.
[22] Filed: Nov. 15, 1972
[21] Appl. No.: 306,599

[52] U.S. Cl. .................. 73/105, 33/172 E
[51] Int. Cl. ............................. G01b 5/28
[58] Field of Search ............ 73/105, 104, 88.5 R; 33/DIG. 13, 172 E

[56] References Cited
UNITED STATES PATENTS
2,487,681 11/1949 Weisselberg ............ 73/88.5 R UX
3,116,469 12/1963 Wu ........................ 73/88.5 R UX Primary Examiner—Richard C. Queisser
Assistant Examiner—John P. Beauchamp
Attorney—John F. Ahern et al.

[57] ABSTRACT

A burr height detector includes a thin flexible strain leaf with an active strain gage located close to an end of the strain leaf. The strain leaf is pressed into engagement with a burr and adjacent workpiece surface and flexes to apply variable strain to the active strain gage depending on burr height. The change in strain gage resistance is measured by a resistance bridge. An array of burr height detectors on a pressure head can be provided.

10 Claims, 6 Drawing Figures

PATENTED DEC 11 1973 3,777,558

PATENTED DEC 11 1973 3,777,558

STRAIN-LEAF BURR HEIGHT DETECTOR

BACKGROUND OF THE INVENTION

This invention relates to a strain-leaf gaging device for detecting and measuring the height of burrs on workpieces, as for example the burrs on sheet metal laminations used in the manufacture of generators and other electric machines.

Several different techniques that may be suggested for detecting burrs are not fully satisfactory as well as not being convenient and readily automated. Burr detection can be achieved using low angle optical illumination and reflection, by employing an array of vertically movable feelers similar to phonograph needles, and by making impressions in thin insulating sheets with attendant resistance tests. The height of the burr is not easily measured by any of these methods. A manual micrometer measurement can be made, of course, but this frequently crushes the burr and the results in general are not reproducible and reliable because of the subjective evaluation made by the operator as to the engaging pressure. Although the determination of burr height has many applications, it is particularly useful in the quality control of stamped sheet metal laminations for electric machines such as generators, to determine when deburring is necessary or when to change the punch press die. These laminations are stacked upon one another with insulation between, and excessively long burrs defeat the function of the insulation by making unwanted electrical contact with an adjacent metal lamination.

SUMMARY OF THE INVENTION

In accordance with the invention, burr height detection and gaging is performed by means of a very thin, flexible strain leaf with an attached active strain gage located in an area that flexes as a function of burr height when that portion of the strain leaf is pressed into engagement with the burr and adjacent workpiece surface. The change of resistance of the active strain gage, which varies with burr height, is detected by a suitable resistance measuring circuit such as a resistance bridge.

In the preferred embodiment, the active strain gage is located very close to the end of the strain leaf that engages the burr, which end is narrowed so that the active strain gage is subjected predominantly to bending forces and little or no twisting forces. A temperature compensating gage is attached to a substantially unstrained portion of the strain leaf. The strain leaf is typically made of a hard metal and the gages are bonded strain gages. Evenly distributed pressure is applied to at least the end of the strain leaf that flexes, for example by using a yieldable member and overlying pressure distributing member secured to that end of the strain leaf. To simultaneously gage the burred edges of a sheet metal generator lamination or other workpiece, an array of burr height detectors is arranged on a pressure head for joint movement toward and away from the workpiece.

DESCRIPTION OF THE PREFERRED EMBODIMENT

Figure 1:
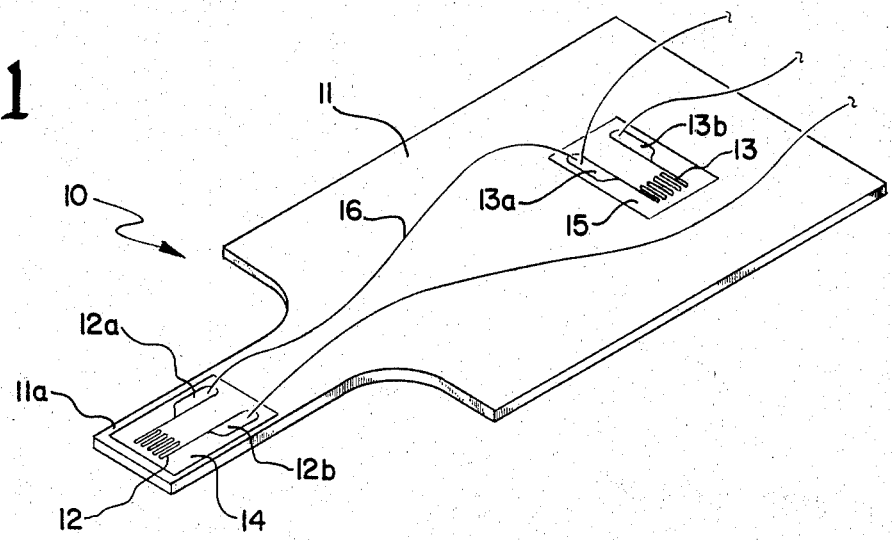
FIG. 1 is a perspective view of the flexible strain leaf per se showing an active strain gage on the narrowed gaging tip and a temperature compensating strain gage.

The detection and measurement of the height of burrs on workpieces is performed by a gaging device incorporating a strain sensing element 10 of the type shown in FIG. 1. Strain sensing element 10 is comprised by a very thin flexible strain leaf 11 to which is attached at least one active strain gage 12 and, preferably, a passive or temperature compensating strain gage 13. Strain leaf 11 is typically several thousandths of an inch in thickness and is made of a hard metal such as hard steel, stainless steel, or even tungsten carbide in order to be resistant to wear by being repeatedly pressed into engagement with the burred edge of a workpiece. Active strain gage 12 is a miniaturized gage and is mounted very close to one end of strain leaf 11 so that small burrs, in the order of 0.006 inch or less in height, produce measurable strains. Rather than using a rectangular strain leaf, best results are obtained by attaching active strain gage 12 to a centrally located, reduced width gaging tip 11a at one end of strain leaf 11. With this construction, active strain gage 12 is responsive primarily to bending forces when placed in operation as shown in FIG. 2, and is not subjected to error by reason of also responding to twisting forces.

Strain gages 12 and 13 are miniaturized, bonded, electrical resistance strain gages. Active strain gage 12 comprises a relatively thin metallic conductor formed in accordian fashion with a pair of contact pads 12a and 12b on an insulating substrate 14. Conventional strain gages that are available commercially can be used in the practice of the invention, such as one type in which the strain gage and contact pads are fabricated by printed circuit techniques on a plastic substrate. Temperature compensating strain gage 13 is preferably identical to the active strain gage, and the unit further includes a pair of contact pads 13a and 13b formed with the strain gage on substrate 15. Conductors 16, which can be discrete wires, connect the strain gages in a suitable resistance measuring circuit such as the half bridge circuit shown in FIG. 4. As has been mentioned, temperature compensating strain gage 13 is a non-strain responsive component in the resistance measuring circuit and thus is mounted toward the rear of strain leaf 11 where it remains relatively flat and is not subjected to bending or twisting forces. To illustrate typical dimensions, strain leaf 11 has an over-all length of 1 inch, an over-all width of ½ inch, and gaging tip 11a has a width of ⅛ inch and a parallel length of threesixteenths inch. The thickness of the leaf is 0.004 inch.

Figure 2:
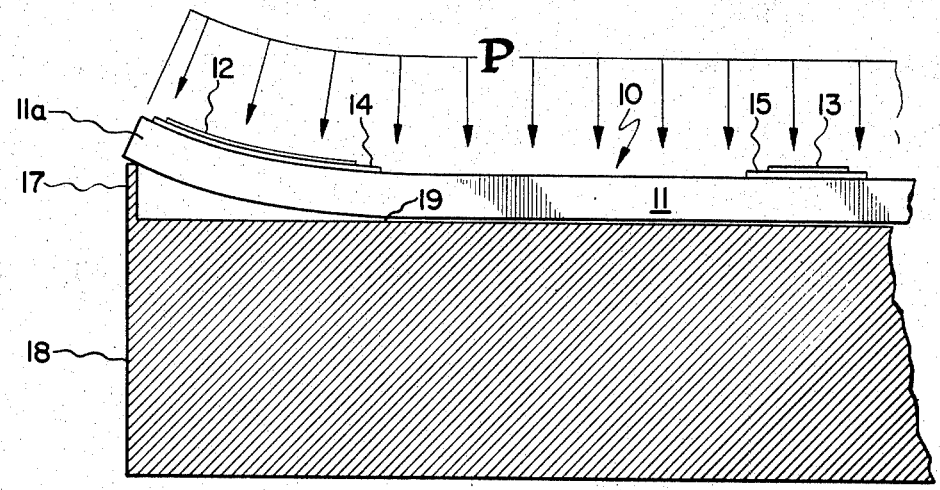
FIG. 2 is a diagrammatic side view illustrating the flexible strain leaf in operative position sensing the height of a burr on a sheet metal lamination.

FIG. 2 illustrates the principle of operation of strain-leaf sensing element 10 when used to measure the height of burrs 17 at one edge of a workpiece 18. Workpiece 18, by way of illustration, is a sheet metal lamination punched out by a punch press that produces the burrs 17 as the result of the shearing action. The gaging tip of strain leaf 11 is aligned with the burred edge of workpiece 18, such that the end of the gaging tip engages burr 17 and projects only a slight distance beyond when a downward pressure P presses strain leaf 11 into engagement with the workpiece. The pressure P causes the gaging tip 11a to flex and apply strain to active strain gage 12a, the amount of applied strain being a function of the height of the burr 17 being measured. Beyond the point of tangency 19, strain leaf 11 is not subjected to bending forces since it is pressed flat against the upper surface of workpiece 18. When gaging a burr 17 that is 0.0003 inch in height, for instance, the point of tangency 19 is 0.060 inch from the edge of the workpiece. The point of tangency remains approximately fixed as the height of the burr being gaged varies. At this scale temperature compensating gage 13 ordinarily would not appear, but is illustrated to show that it is located in an area not subjected to strain.

Figure 3:
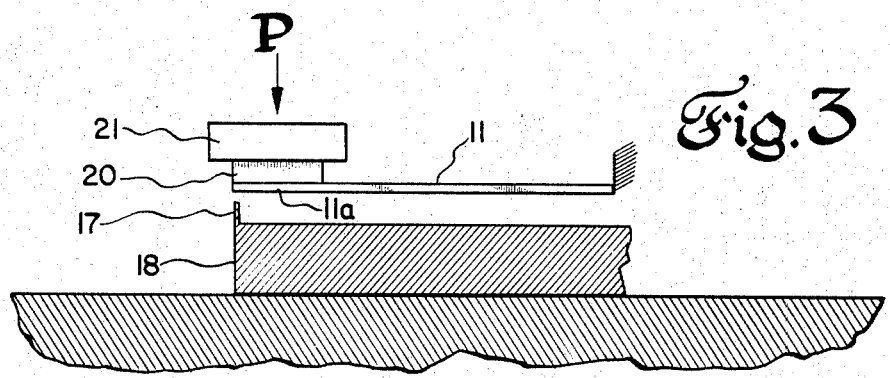
FIG. 3 is a diagrammatic side view of the workpiece and flexible strain leaf with one form of suitable structure for applying evenly distributed pressure to the gaging tip.

The applied pressure P is preferably evenly distributed over the full length of the parallel portion of the gaging tip 11a. For the specific strain-leaf sensing element being described, an evenly distributed pressure of 60 lbs/sq. in. gives good results. While it is not incorrect to apply the pressure over the full length of strain leaf 11, this is not required. A preferred pressure applying structure is illustrated in FIG. 3. In this diagram strain leaf 11 is mounted in cantilever fashion with the end remote from gaging tip 11a fixedly mounted in appropriate manner, although the entire strain leaf 11 can also be mounted to move up and down as a unit. A yieldable pressure applying member 20 made of soft rubber or other material is secured, as by cementing, to the upper face of gaging tip 11a, extending over the full area of the gaging tip and covering the active strain gage 12. A metallic disk 21 may be secured to the upper surface of yieldable pressure-applying member 20 to distribute the applied pressure. The application of pressure P to disk 21 manually or by some suitable mechanical structure causes the strain leaf gaging tip 11a to be pressed into engagement with the burr 17 and the upper surface of workpiece 18 as shown in FIG. 2. The flexed end of gaging tip 11a is pressed upward into soft rubber member 20, which yields. The remaining portions of strain leaf 11 not attached to pressure-applying member 20 are, of course, not in engagement with the workpiece 18, but this is not needed to obtain an accurate measurement of burr height.

Figure 4:
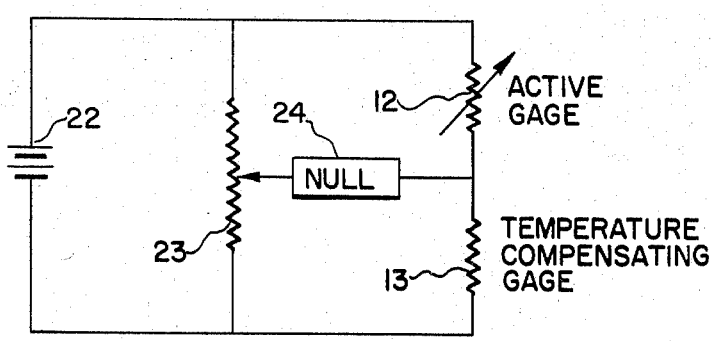
FIG. 4 is a schematic circuit diagram of the equivalent resistances for the active and temperature compensating strain gages connected in a Wheatstone bridge circuit for measuring the burr height.

In FIG. 4 is shown a resistance measuring bridge circuit for determining the height of a gaged burr. The equivalent resistances for active gage 12 and temperature compensating gage 13 are connected in a Wheatstone bridge. In this arrangement, series-connected gages 12 and 13 are connected across the terminals of a battery 22, and a balancing potentiometer 23 is also connected to the battery. A null detector 24 is further connected to the junction of gages 12 and 13 and to the pointer of potentiometer 23. Since the resistance of active gage 12 changes as a function of the applied strain, which varies with the height of the burr being gaged, the equivalent circuit representation is a variable resistor. Temperature compensating gage 13 is not subjected to strain and therefore is represented as a fixed resistor. Assuming proper calibration, the pointer of potentiometer 23 is adjusted until null detector 24 indicates a null, and the relative values of the two portions of potentiometer 23 are indicative of the burr height. In appropriate cases other resistance measuring circuits can be used including commercially available amplifiers made specifically for the purpose of reading strain gage resistance changes.

Figure 5:
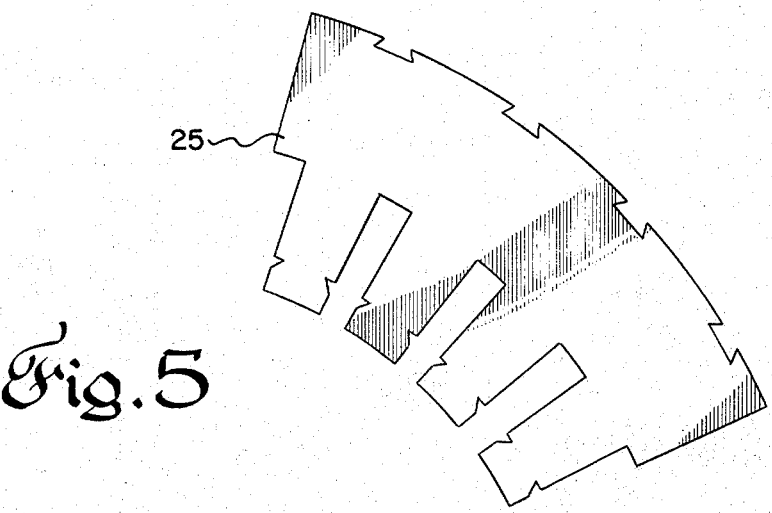
FIG. 5 is a plan view of a stamped sheet metal generator lamination.

Although the strain-leaf burr height detector and gage here described has many applications, it is particularly useful to measure the height of burrs on sheet metal laminations used to manufacture generators and other electric machines. A generator lamination 25, in one of the many configurations in which they are manufactured, is illustrated in FIG. 5. These sheet metal laminations, made of electrical grade steel, are commonly coated with shellac or other insulating material and stacked one upon the other to form a generator rotor or stator part. The shearing action of the punch press on which they are fabricated leaves an upstanding burr at the edges of the lamination. Burr height must be controlled thoroughly in generators, since if they get too large, adjacent laminations can short circuit and cause a generator malfunction. The strain-leaf burr height detector functions either to determine when a separate deburring step is needed, or when a change of punch press die is required. An array of strain-leaf burr height detectors can be used, all operating simultaneously and located at selected positions on the workpiece where it is known that burrs are formed or likely to be formed.

Figure 6:
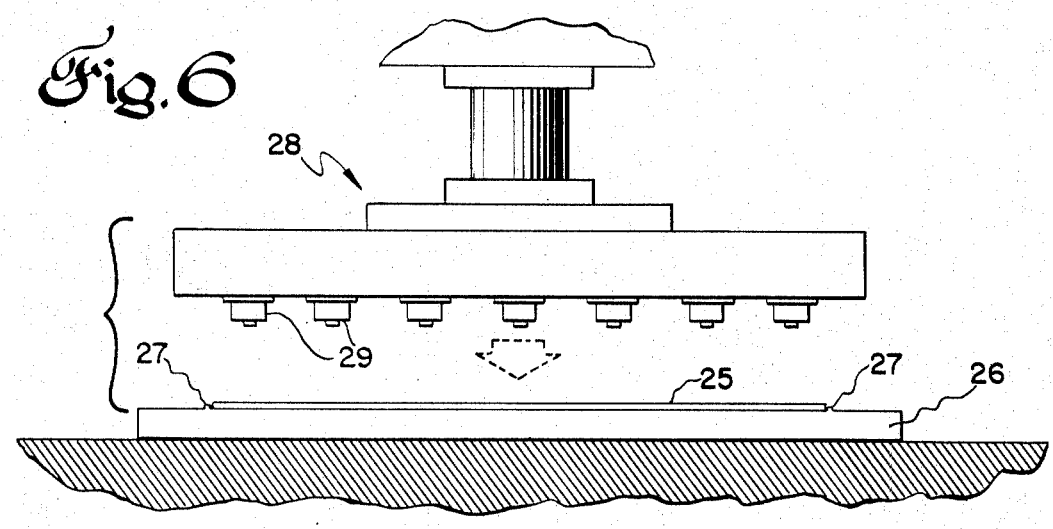
FIG. 6 is a diagrammatic elevational view of a pressure head with an array of strain-leaf gages for measuring the height of burrs at predetermined locations on the generator lamination of FIG. 5

A preferred embodiment of the invention in which an array of strain-leaf burr height detectors are mounted on a movable pressure head is illustrated in FIG. 6. A jig 26 is provided and has a number of stops 27 positioned so as to accurately locate the sheet metal lamination 25. A pressure head assembly 28 has on its lower surface a plurality of strain-leaf burr height detector units as previously described, here designated by the numeral 29. The gaging tip of each individual strain leaf in each unit 29 is, of course, precisely located with regard to the burred edge of the workpiece to be gaged. The pressure head assembly 28 is moved up and down into and out of engagement with the sheet metal lamination 25, measuring the height of the burrs at each location. The measured output data can be fed to a computer to keep a continuous check of the burr heights, can be fed to an alarm that signals an excessive burr height, or used in some other manner. An advantageous construction, not here illustrated, for an array of strain-leaf burr detectors is to use a single thin sheet of metal with localized areas of plastic insulating material to which the individual active strain gages are bonded. The thin sheet of metal with an array of strain gages is in turn bonded to a single thin sheet of rubber material. Another application is that a single strain-leaf burr height detector can be incoporated in a manual tool with a plier-like handle arrangement for applying pressure during the gaging operation.

In summary, a burr height detector for general usage with a variety of workpieces is based on a unique application of the strain gage principle. By employing a thin flexible strain leaf and miniaturized strain gage, the strain applied to the strain gage is a function of burr height when the strain leaf is pressed into engagement with the burr and adjacent workpiece surface. The strain-leaf burr height detector is convenient, accurate, gives reproducible results and is capable of automation.

While the invention has been particularly shown and described with reference to several preferred embodiments, it will be understood by those skilled in the art that various changes in form and details may be made without departing from the spirit and scope of the invention.

What I claim as new and desire to secure by Letters Patent of the United States is:

1. A burr height detector comprising
   a strain sensing element including a flexible strain leaf and at least one attached active strain gage,
   means for pressing at least a portion of said strain leaf into engagement with a burr and adjacent workpiece surface to apply strain to said active strain gage that varies with the burr height, and
   a circuit for detecting the change in resistance of said active strain gage.

2. A construction according to claim 1 wherein said active strain gage is located relatively close to one end of said flexible strain leaf.

3. A construction according to claim 1 wherein said flexible strain leaf has a narrowed gaging tip, and
   said active strain gage is located on said gaging tip relatively close to one end of said strain leaf.

4. A construction according to claim 1 wherein said strain sensing element further includes a temperature compensating strain gage attached to a substantially unstrained portion of said strain leaf.

5. A construction according to claim 1 wherein said means for pressing at least a portion of said strain leaf into engagement with a burr and adjacent workpiece surface comprises a yieldable member and overlying pressure distributing member attached to said portion of said strain leaf.

6. A burr height detector comprising
   a strain sensing element including a flexible strain leaf and an active strain gage attached relatively close to one end of said strain leaf,
   pressure applying means for pressing said one end of said strain leaf into engagement with a burr and adjacent workpiece surface to thereby flex at least a portion of said strain leaf and apply variable strain to said active strain gage as a function of burr height, and
   a resistance measuring circuit for measuring the change in resistance of said active strain gage.

7. A construction according to claim 6 wherein said one end of said strain leaf to which said active strain gage is attached is relatively narrow whereby said active strain gage is subjected only to bending forces.

8. A construction according to claim 6 wherein said strain sensing element further includes a temperature compensating strain gage attached to a substantially unstrained portion of said strain leaf.

9. A construction according to claim 6 wherein said pressure applying means comprises a yieldable member and overlying pressure distributing member secured to at least the flexed portion of said strain leaf.

10. A construction including an array of burr height detectors as defined in claim 6 arranged on a pressure head for joint movement toward and away from the workpiece.

* * * * *